(12) United States Patent
Gopalakrishnan et al.

(10) Patent No.: US 11,767,007 B2
(45) Date of Patent: Sep. 26, 2023

(54) APPARATUS AND METHOD FOR ENERGY MANAGEMENT FOR DUAL ENERGY STORAGE

(71) Applicant: GM Global Technology Operations LLC, Detroit, MI (US)

(72) Inventors: Suresh Gopalakrishnan, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 17/376,700

(22) Filed: Jul. 15, 2021

(65) Prior Publication Data

US 2023/0018561 A1  Jan. 19, 2023

(51) Int. Cl.
| | | |
|---|---|---|
| *B60W 20/13* | (2016.01) | |
| *B60L 15/20* | (2006.01) | |
| *B60L 58/12* | (2019.01) | |
| *B60R 16/00* | (2006.01) | |
| *B60W 20/15* | (2016.01) | |
| *B60W 30/182* | (2020.01) | |
| *B60L 58/20* | (2019.01) | |

(52) U.S. Cl.
CPC ............. *B60W 20/13* (2016.01); *B60L 15/20* (2013.01); *B60L 58/12* (2019.02); *B60L 58/20* (2019.02); *B60R 16/005* (2013.01); *B60W 20/15* (2016.01); *B60W 30/182* (2013.01); *B60L 2210/10* (2013.01)

(58) Field of Classification Search
CPC .... B60W 20/13; B60W 20/15; B60W 30/182; B60L 15/20; B60L 58/12; B60L 58/20; B60L 2210/10; B60L 2240/12; B60L 2240/421; B60L 2240/423; B60L 2240/425; B60L 2240/441; B60L 2240/445; B60L 50/61; B60R 16/005
See application file for complete search history.

(56) References Cited

U.S. PATENT DOCUMENTS

| | | | |
|---|---|---|---|
| 10,189,470 B2 * | 1/2019 | Atluri | B60W 10/30 |
| 2011/0313613 A1 * | 12/2011 | Kawahara | B60L 50/61 |
| | | | 320/134 |
| 2014/0024490 A1 * | 1/2014 | Bangura | B60L 7/14 |
| | | | 475/5 |
| 2014/0266038 A1 * | 9/2014 | Gibeau | B60L 53/52 |
| | | | 320/109 |
| 2016/0082772 A1 * | 3/2016 | Biderman | B60K 7/00 |
| | | | 301/6.5 |
| 2017/0197613 A1 * | 7/2017 | Gv | F16H 3/728 |

(Continued)

*Primary Examiner* — Mussa A Shaawat
(74) *Attorney, Agent, or Firm* — Vivacqua Crane, PLLC

(57) ABSTRACT

An electrical energy management system includes a first battery having a nominal operating voltage, a second battery having a charging voltage sufficiently close to the nominal operating voltage of the first battery such that the first battery can charge the second battery when the first battery and the second battery are electrically connected in parallel, a generator that is controllable to provide a variable output voltage, a starter motor, an electrical load, a plurality of switches each controllable to be in an open state or a closed state, and a controller that is configured to control the output voltage of the generator and to control the open or closed state of each of the plurality of switches.

20 Claims, 3 Drawing Sheets

(56) References Cited

U.S. PATENT DOCUMENTS

| | | | | |
|---|---|---|---|---|
| 2017/0267230 A1* | 9/2017 | Lyons | ................... | B60W 20/17 |
| 2018/0257633 A1* | 9/2018 | Meyer | ................... | B60W 10/06 |
| 2018/0281597 A1* | 10/2018 | Herb | ................... | B60L 3/0084 |
| 2020/0070679 A1* | 3/2020 | Wang | ...................... | B60L 58/21 |
| 2020/0391724 A1* | 12/2020 | Shidore | ................. | B60K 6/485 |

* cited by examiner

| Operating Mode / Scenario | Battery Charge Conditions | | Switch States (0=open, 1=closed) | | | Generator Voltage |
|---|---|---|---|---|---|---|
| | SOC1 | SOC2 | S1 | S2 | S3 | |
| Vehicle ignition off | | | 0 | 0 | 0 | |
| Cold Crank | | | 0 | 0 | 1 | |
| Idle 1 | >Threshold1 | | 0 | 0 | 0 | Minimum |
| Idle 2 | <Threshold1 | >Threshold2 | 1 | 1 | 0 | Minimum |
| Idle 3 | <Threshold1 | <Threshold2 | 1 | 1 | 0 | Optimum |
| Acceleration 1 | >Threshold1 | | 0 | 0 | 0 | Minimum |
| Acceleration 2 | <Threshold1 | >Threshold2 | 1 | 1 | 0 | Minimum |
| Acceleration 3 | <Threshold1 | <Threshold2 | 1 | 1 | 0 | Optimum |
| Cruise 1 | >Threshold1 | | 0 | 0 | 0 | Minimum |
| Cruise 2 | <Threshold1 | >Threshold2 | 1 | 1 | 0 | Minimum |
| Cruise 3 | <Threshold1 | <Threshold2 | 1 | 1 | 0 | Optimum |
| Opportunity charging 1 | <Threshold1 | <Threshold2 | 1 | 1 | 0 | Optimum |
| Opportunity charging 2 | >Threshold1 | <Threshold2 | 0 | 1 | 0 | Optimum |
| Opportunity charging 3 | <Threshold1 | >Threshold2 | 1 | 0 | 0 | Optimum |
| Opportunity charging 4 | >Threshold1 | >Threshold2 | 1 | 0 | 0 | Optimum |
| Opportunity charging 5 | <Threshold1 | <Threshold2 | 0 | 0 | 1 | 24V |
| Coasting / Braking 1 | <Threshold1 | <Threshold2 | 1 | 1 | 0 | Optimum |
| Coasting / Braking 2 | >Threshold1 | <Threshold2 | 0 | 1 | 0 | Optimum |
| Coasting / Braking 3 | <Threshold1 | >Threshold2 | 1 | 0 | 0 | Optimum |
| Coasting / Braking 4 | >Threshold1 | >Threshold2 | 1 | 0 | 0 | Optimum |
| Coasting / Braking 5 | <Threshold1 | <Threshold2 | 0 | 0 | 1 | 24V |
| Auto Stop 1 | >Threshold1 | | 0 | 0 | 0 | |
| Auto Stop 2 | <Threshold1 | >Threshold2 | 1 | 1 | 0 | |
| Auto Stop 3 | <Threshold1 | <Threshold2 | 1 | 1 | 0 | |
| Auto Start | | | 0 | 0 | 1 | |

FIG. 3

APPARATUS AND METHOD FOR ENERGY MANAGEMENT FOR DUAL ENERGY STORAGE

INTRODUCTION

The present disclosure relates to an apparatus and method for an energy management system, as may be used in a vehicle powertrain.

A vehicle using an internal combustion engine may utilize several approaches to improve fuel economy and reduce $CO_2$ emissions while operating. In some vehicle applications, a start-stop system is used, where the engine is automatically shut off (referred to herein as an auto-stop event) to conserve fuel when vehicle propulsion is not required, and automatically restarted (referred to herein as an auto-start event) when vehicle drive torque is required. An energy recuperation system to convert vehicle kinetic energy to storable electrical energy when braking the vehicle may also be used in some vehicle applications to improve vehicle efficiency.

Thus, while current energy management systems in vehicles achieve their intended purpose, there is a need for a new and improved system and method for energy management of a vehicle engine.

SUMMARY

According to several aspects, an electrical energy management system for a powertrain is disclosed. The powertrain includes an internal combustion engine configured to deliver mechanical energy to a mechanical load. The electrical energy management system includes a first battery having a nominal operating voltage and a second battery having a charging voltage sufficiently close to the nominal operating voltage of the first battery such that the first battery can charge the second battery when the first battery and the second battery are electrically connected in parallel. The electrical energy management system also includes a generator that is controllable to provide a variable output voltage around two distinct nominal voltages (e.g., 12V and 24V), a starter motor, an electrical load, and a plurality of switches, each of the plurality of switches controllable to be in an open state or a closed state. A controller is configured to control the output voltage of the generator and to control the open or closed state of each of the plurality of switches, the controller including non-transitory computer-readable media containing instructions that when executed cause the controller to execute a method comprising the steps of receiving information regarding operating conditions of the powertrain, determining a desired operating mode based on the operating conditions, determining a desired operating scenario based on the operating conditions, and providing control signals to configure the generator and each of the plurality of switches, wherein the configuration of the generator and the configuration of the switches is based on the desired operating scenario.

In an additional aspect of the electrical energy management system of the present disclosure, the nominal operating voltage is 12 volts.

In another aspect of the electrical energy management system of the present disclosure, when the state of charge of the first battery is above a predetermined threshold value the determination of the desired operating scenario does not depend on the state of charge of the second battery.

In a further aspect of the electrical energy management system of the present disclosure, the desired operating scenario is determined based on the state of charge of the second battery when the state of charge of the first battery is below a predetermined threshold value.

In an aspect of the electrical energy management system of the present disclosure, in a first configuration of the switches the first battery is connected electrically in parallel with the second battery and in a second configuration of the switches the first battery is connected electrically in series with the second battery.

In another aspect of the electrical energy management system of the present disclosure, in a third configuration of the switches the generator is electrically connected so as to be able to supply current to the first battery without being able to supply current to the second battery.

In a further aspect of the electrical energy management system of the present disclosure, in a fourth configuration of the switches the generator is electrically connected so as to be able to supply current to the second battery without being able to supply current to the first battery.

In another aspect of the electrical energy management system of the present disclosure, the desired operating mode is selected from the group consisting of cold crank, idle, acceleration, cruise, opportunity charging, coasting/braking, auto stop, and auto start.

In a further aspect of the electrical energy management system of the present disclosure, the electrical energy management system includes a DC-DC converter configured to provide a stabilized voltage bus to source current to a voltage-sensitive load.

According to several aspects, a method is disclosed for controlling an electrical energy management system for a powertrain. The powertrain includes an internal combustion engine configured to deliver mechanical energy to a mechanical load. The electrical energy management system includes a first battery having a nominal operating voltage, and a second battery having a charging voltage sufficiently close to the nominal operating voltage of the first battery such that the first battery can charge the second battery when the first battery and the second battery are electrically connected in parallel. The electrical energy management system also includes a generator that is controllable to provide a variable output voltage, a starter motor, an electrical load, and a plurality of switches, each of the plurality of switches controllable to be in an open state or a closed state. The method includes the steps of receiving information regarding operating conditions of the powertrain, determining a desired operating mode based on the operating conditions, determining a desired operating scenario based on the operating conditions, and providing control signals to configure the generator and each of the plurality of switches, wherein the configuration of the generator and the configuration of the switches is based on the desired operating scenario.

In an aspect of the method of the present disclosure, the nominal operating voltage is 12 volts.

In another aspect of the method of the present disclosure, when the state of charge of the first battery is above a predetermined threshold value the determination of the desired operating scenario does not depend on the state of charge of the second battery.

In a further aspect of the method of the present disclosure, the desired operating scenario is determined based on the state of charge of the second battery when the state of charge of the first battery is below a predetermined threshold value.

In an additional aspect of the method of the present disclosure, in a first configuration of the switches the first battery is connected electrically in parallel with the second battery and in a second configuration of the switches the first battery is connected electrically in series with the second battery.

In a further aspect of the method of the present disclosure, in a third configuration of the switches the generator is electrically connected so as to be able to supply current to the first battery without being able to supply current to the second battery.

In another aspect of the method of the present disclosure, in a fourth configuration of the switches the generator is electrically connected so as to be able to supply current to the second battery without being able to supply current to the first battery.

In an additional aspect of the method of the present disclosure, the desired operating mode is selected from the group consisting of cold crank, idle, acceleration, cruise, opportunity charging, coasting/braking, auto stop, and auto start.

In an aspect of the method of the present disclosure, the electrical energy management system further comprises a DC-DC converter configured to provide a stabilized voltage bus to source current to a voltage-sensitive load.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a table showing operating modes of the electrical energy management system shown in FIG. 1.

Figure 1:
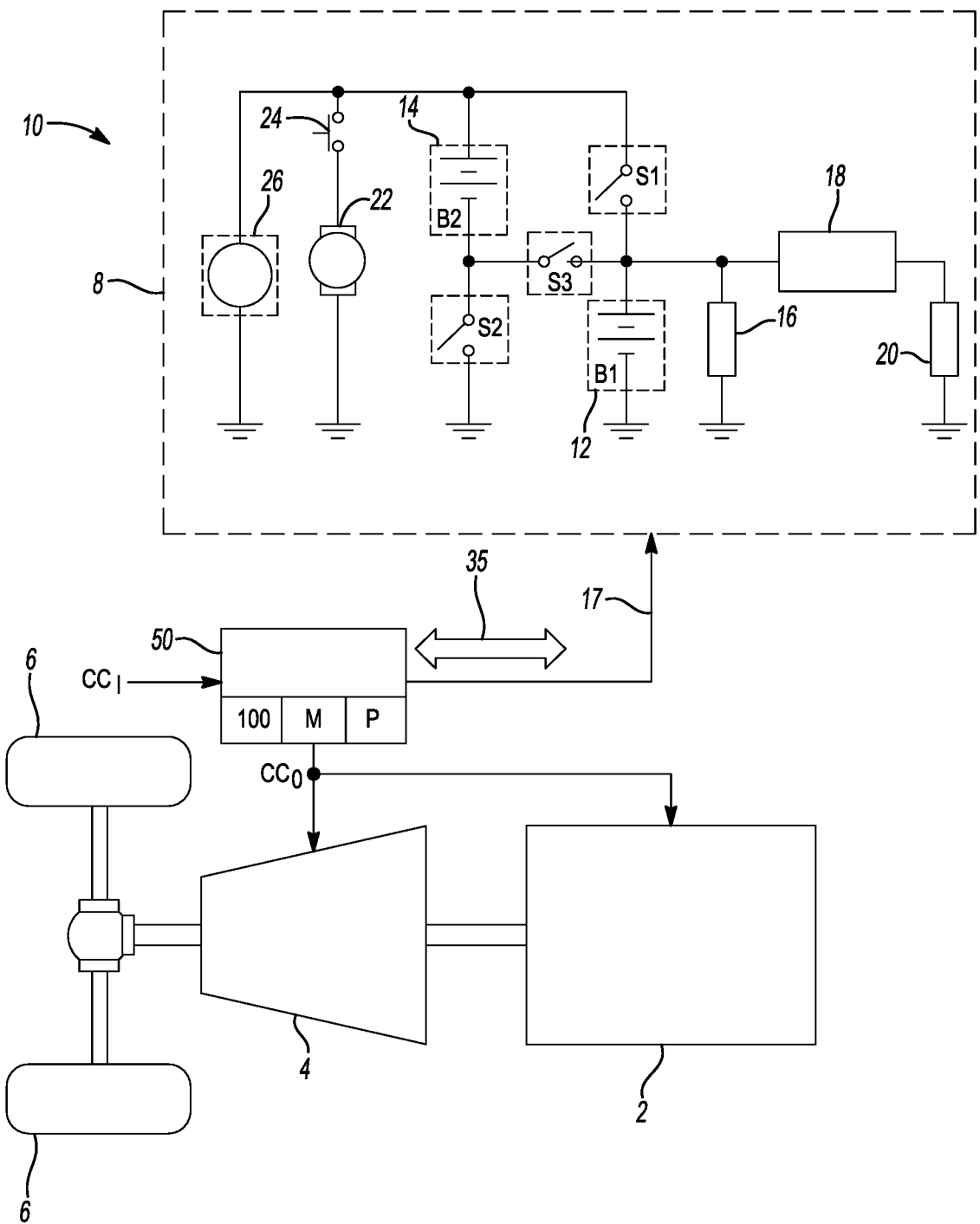
FIG. 1 is a schematic illustration of an example electrical energy management system for a vehicle.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The following description is merely exemplary in nature and is not intended to limit the present disclosure, application, or uses.

Regenerative braking slows down a moving vehicle by converting its kinetic energy into electrical energy that can be stored in a battery until needed. A generator uses the vehicle's momentum to recover energy that would otherwise be lost to the brake discs as heat. Controls conventionally used in vehicles maximize the energy recuperation during coasting and/or braking events by adjusting the output voltage of the generator. Generators used in conventional vehicles typically operate in the range of 12.2V to 15.5V (nominally "12V systems"). The amount of energy recovered during regenerative braking is limited by the power output of the generator and the charge acceptance of the vehicle battery. The power output of the generator is limited by the maximum current rating of the generator. If the generator voltage can be set to 24V, the power output can potentially double for a given maximum current, allowing more energy recuperation.

In some vehicle applications, a start-stop system is used, where the engine is automatically shut off (referred to herein as an auto-stop event) to conserve fuel when vehicle propulsion is not required, and automatically restarted (referred to herein as an auto-start event) when vehicle drive torque is required. An electric starter motor is typically used to turn the engine crankshaft to initiate combustion in the engine when the engine is started from a stopped state. Providing power to the starter motor to provide rapid restarting without undesirable delay may be challenging, especially with low battery voltage and/or low temperature.

Referring to the drawings, an example powertrain 10 is shown schematically in FIG. 1. The powertrain 10 includes an internal combustion engine 2. The engine 2 may be embodied as a gasoline or diesel engine, and ultimately outputs engine torque to a transmission 4, e.g., via a hydrodynamic torque converter or clutch (not shown). The transmission 4 ultimately delivers output torque at a particular gear or speed ratio to a mechanical load 6. The mechanical load 6 is depicted in FIG. 1 as a set of drive wheels in an example automotive application. Other beneficial applications for the powertrain 10 may be envisioned, including power plants, robotics, mobile platforms, and non-motor vehicle applications such as watercraft, marine vessels, rail vehicles, and aircraft, and therefore the motor vehicle embodiment of FIG. 1 is intended to be illustrative of the disclosed concepts without limitation.

With continued reference to FIG. 1, the powertrain 10 includes an electrical energy management system 8. The exemplary electrical energy management system 8 includes a first battery 12 and a second battery 14. A first switch S1 is provided to allow the positive terminal of the first battery 12 to be selectively connected with the positive terminal of the second battery 14. A second switch S2 is provided to allow the negative terminal of the second battery 14 to be selectively connected with the system ground. A third switch S3 is provided to allow the positive terminal of the first battery 12 to be selectively connected to the negative terminal of the second battery 14. By configuring the switches S1, S2, and S3, the first battery 12 and the second battery 14 can be selectively connected in series, connected in parallel, or electrically isolated. In an embodiment, both the first battery 12 and the second battery 14 have a nominal voltage of 12V.

With continued reference to FIG. 1, the powertrain 10 also includes electrical loads 16 connected across the first battery 12. A DC-DC converter 18 is also provided as part of the powertrain 10 to supply power to voltage-sensitive electrical loads 20. A starter motor 22 provides cranking torque to start the vehicle engine 2 when a starter switch 24 is closed. A generator 26 converts mechanical energy from the engine 2 or from a regenerative braking system into electrical energy. The generator 26 is controllable to provide power either at 12V nominal or at 24V nominal.

As explained in further detail below with reference to FIGS. 2 and 3, a controller 50, such as an engine control module in an exemplary vehicle embodiment, is configured to execute a method 100 in the overall control of the powertrain 10. The controller 50 provides signals to the generator 26 to set the output voltage level of the generator 26. Additionally, the controller 50 provides signals to set the on-off state of the starter switch 24 and the switches S1, S2, and S3. Each of the starter switch 24 and the switches S1, S2, and S3 may be implemented as a mechanical relay or as a solid-state switch, including but not limited to a MOSFET, an IGBT, a GaN FET, or a SiC MOSFET.

The controller 50 of FIG. 1 is configured to receive measured voltage, current, position, temperature, and/or other suitable electrical value as part of a set of input signals (arrow $CC_I$). The controller 50 may be variously implemented as one or more control devices collectively managing the electrical energy management system 8 as part of the method 100. The controller 50 is configured to control devices in the energy management system 8, including the generator 26 and the switches S1, S2, S3 with a set of control signals 17.

Multiple controllers may be in communication via a serial bus, e.g., a CAN bus 35, other differential voltage networks, or via discrete conductors.

The controller 50 may include one or more digital computers each having a processor (P), e.g., a microprocessor or central processing unit, as well as memory (M) in the form of read only memory, random access memory, electrically-programmable read only memory, etc., a high-speed clock, analog-to-digital and digital-to-analog circuitry, input/output circuitry and devices, and appropriate signal conditioning and buffering circuitry. The controller 50 may also store algorithms and/or computer executable instructions in memory (M), including the underlying algorithms or code embodying the method 100 described below, and transmit commands to the electrical energy management system 8 to enable performance of certain control actions according to the present disclosure.

The controller 50 is in communication with the engine 2 and receives, as part of the input signals (arrow $CC_I$), signals indicative of a speed and temperature of the engine 2, vehicle speed, transmission gear state, torque converter clutch state, brake switch state as well as other possible engine operating conditions or parameters such as a starting request of the engine 2, whether operator-initiated or autonomously generated. The controller 50 is also in communication with the starter motor 22, and thus receives signals indicative of starter motor speed, current draw, torque, temperature, and/or other operating parameters. The controller 50 may also communicate with the first battery 12 and the second battery 14 and receive signals indicative of a battery state of charge (SOC), temperature, and current draw, as well as a voltage across the DC voltage bus 15. As used herein the terms "state of charge" and "SOC" refer to the amount of charge remaining in a battery at a point in time, expressed as a percentage of the amount of charge available when the battery is fully charged. The controller 50 may also transmit output signals (arrow CCo) to the engine 2 and transmission 4 as part of the overall operating function of the controller 50.

Figure 2:
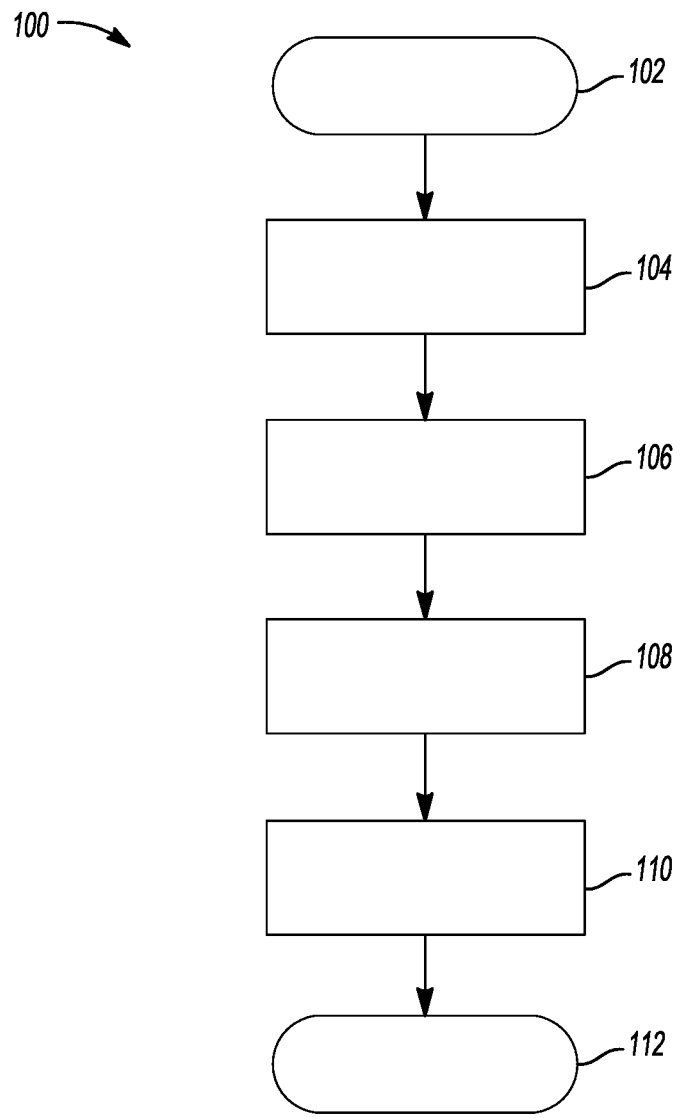
FIG. 2 is a flow chart of a control algorithm for the electrical energy management system shown in FIG. 1.

Referring to FIG. 2, the method 100 according to an example embodiment commences at step 102. The method 100 may be initiated in any of several ways, such as a time-based approach (e.g., a fixed number of milliseconds) or an event-based approach (e.g., upon a vehicle ignition switch being turned on). After entry at step 102, at step 104 the controller 50 inputs vehicle operating conditions. These operating conditions may include vehicle speed, engine speed, transmission gear state, torque converter clutch state, brake switch state, state-of-charge (SOC) of the first battery 12, and SOC of the second battery 14.

After step 104 is completed the method 100 proceeds to step 106, where a desired operating mode for the electrical energy management system 8 is determined based on the operating conditions received in step 104. As will be discussed in further detail relative to FIG. 3 the desired operating mode is generally chosen from ignition off, crank, idle, acceleration, cruise, opportunity charging, coasting/braking, auto stop, and auto start.

After the desired operating mode is identified in step 106, the method 100 proceeds to step 108. In step 108, a desired operating scenario within the desired operating mode is identified, as will be discussed in further detail relative to FIG. 3. The method 100 then proceeds to step 110, where the controller 50 provides control signals to the electrical energy management system 8 to configure the devices in the electrical energy management system 8 according to the desired operating mode and operating scenario. As used herein with respect to the devices in the electrical energy management system 8, the terms "configure" and "configuration" refer to the open or closed state of each of the switches S1, S2, S3, as well as to the commanded voltage output of the generator 26. Following step 110, the method 100 then exits at step 112 to await subsequent execution being reinitiated at step 102.

FIG. 3 includes a table 200 that summarizes operating modes and scenarios, as well as controlled states of devices in the electrical energy management system 8 corresponding to each of the listed operating modes and scenarios, in accordance with the present disclosure. Referring to FIG. 3, the column 205 lists each operating mode and scenario. Columns 210 and 215 list conditions for the state of charge of the first battery 12 (SOC1) and the state of charge of the second battery 14 (SOC2) respectively, with the conditions listed that are used to determine which mode and scenario in column 205 are identified in steps 106 and 108 of FIG. 2.

With continued reference to FIG. 3, columns 225, 230, and 235 list the on-off state to which the switches S1, S2, and S3 respectively are controlled in step 110 of FIG. 2 for the given operating mode and scenario. Column 245 lists the output level to which the generator 26 is controlled for the given operating mode and scenario. Column 250 summarizes energy flow in the electrical energy management system 8 that results from the switch settings listed in columns 225, 230, 235 and the generator output level listed in column 245 for the given operating mode and scenario. In the following discussion of FIG. 3, "B1" refers to the first battery 12 and "B2" refers to the second battery 14.

Row 255 in FIG. 3 represents an operating mode wherein the vehicle ignition is off. In this operating mode, the state of charge of the first battery 12 and the second battery 14 are not considered. In this operating mode, switch S1 is open, switch S2 is open, and switch S3 is open. Generator voltage level is irrelevant since the generator is not producing power. In this operating mode, the first battery 12 supplies power to any parasitic loads in the vehicle.

Row 260 in FIG. 3 represents an operating mode wherein the vehicle is being cold cranked, i.e., cranked for the first time since the vehicle ignition is turned on. In this operating mode, the state of charge of the first battery 12 and the second battery 14 are not considered. In this operating mode, switch S1 is open, switch S2 is open, and switch S3 is closed. Generator voltage level is irrelevant since the generator is not producing power. In this operating mode, the first battery 12 is connected in series with the second battery 14, resulting in a nominal voltage of 24 volts supplied to the starter motor 22.

After the engine starts following cold cranking, switches S1 and S2 are closed and S3 is kept open for a predetermined time to allow the generator to replenish the battery charge lost during the cold crank event. After the predetermined time has elapsed when the engine is idling one of three idle scenarios is entered. As used herein, the term "idling" refers to running the vehicle's engine when the vehicle is not in motion. A first idle scenario represented by row 265 is entered when the SOC of the first battery B1 is above a predetermined threshold, for example 90%. In the first idle scenario, S1, S2, and S3 are all open and the generator output is set to a minimum level so that only B1 will supply the electrical loads 16.

While the engine is idling, the configuration of the electrical energy management system 8 is kept in this first idle scenario until the SOC of the first battery B1 falls below a predetermined threshold, for example 80%, at which time the SOC of the second battery B2 determines the idle scenario to be entered. If the SOC of the second battery B2 is above a predetermined threshold, for example 60%, a second idle scenario is entered as shown in row 270. In the second idle scenario S1 and S2 are closed, S3 is open, and the generator output is set to a minimum level so that B2 will supply the electrical loads 16 and also charge B1.

As the engine continues to idle, the configuration of the electrical energy management system 8 is kept in this second idle scenario until the SOC of the second battery B2 falls below a predetermined threshold, for example 30%, while the SOC of the first battery 61 is below a predetermined threshold, for example 80%, at which time a third idle scenario is entered as shown in row 275. In the third idle scenario S1 and S2 are closed, S3 is open, and the generator output is set to an optimum so that the generator 26 will supply the electrical loads 16 and also charge B1 and B2. As the SOC of the first battery B1 and the SOC of the second battery B2 rise, the method 100 continues to determine the desired operating mode and operating scenario.

With continued reference to FIG. 3, rows 280, 285, and 290 summarize the criteria and corresponding responses used by the method 100 for scenarios when the vehicle is accelerating. During acceleration it is desirable to not load the generator so as to reduce mechanical loading of the engine. A first acceleration scenario represented by row 280 is entered when the SOC of the first battery 61 is above a predetermined threshold, for example 80%. In the first acceleration scenario, S1, S2, and S3 are all open and the generator output is set to a minimum level so that only B1 will supply the electrical loads 16.

While the vehicle is accelerating, the configuration of the electrical energy management system 8 is kept in this first acceleration scenario until the SOC of the first battery 61 falls below a predetermined threshold, for example 80%, at which time the SOC of the second battery B2 determines the acceleration scenario to be entered. If the SOC of the second battery B2 is above a predetermined threshold, for example 60%, a second acceleration scenario is entered as shown in row 285. In the second acceleration scenario S1 and S2 are closed, S3 is open, and the generator output is set to a minimum level so that B2 will supply the electrical loads 16 and also charge B1.

As the vehicle continues to accelerate, the configuration of the electrical energy management system 8 is kept in this second acceleration scenario until the SOC of the second battery B2 falls below a predetermined threshold, for example 30%, while the SOC of the first battery B1 is below a predetermined threshold, for example 80%, at which time a third acceleration scenario is entered as shown in row 290. In the third acceleration scenario S1 and S2 are closed. S3 is open, and the generator output is set to an optimum so that the generator 26 will supply the electrical loads 16 and also charge B1 and B2. As the SOC of the first battery B1 and the SOC of the second battery B2 rise, the method 100 continues to determine the desired operating mode and operating scenario.

With continued reference to FIG. 3, rows 295, 300, and 305 summarize the criteria and corresponding responses used by the method 100 for scenarios when the vehicle is cruising. During cruise it is desirable to not load the generator so as to reduce mechanical loading of the engine.

A first cruise scenario represented by row 295 is entered when the SOC of the first battery B1 is above a predetermined threshold, for example 80%. In the first cruise scenario, S1, S2, and S3 are all open and the generator output is set to a minimum level so that only B1 will supply the electrical loads 16.

While the vehicle is cruising, the configuration of the electrical energy management system 8 is kept in this first cruise scenario until the SOC of the first battery B1 falls below a predetermined threshold, for example 80%, at which time the SOC of the second battery B2 determines the cruise scenario to be entered. If the SOC of the second battery B2 is above a predetermined threshold, for example 60%, a second cruise scenario is entered as shown in row 300. In the second cruise scenario S1 and S2 are closed, S3 is open, and the generator output is set to a minimum level so that B2 will supply the electrical loads 16 and also charge B1.

As the vehicle continues to cruise, the configuration of the electrical energy management system 8 is kept in this second cruise scenario until the SOC of the second battery B2 falls below a predetermined threshold, for example 30%, while the SOC of the first battery B1 is below a predetermined threshold, for example 80%, at which time a third cruise scenario is entered as shown in row 305. In the third cruise scenario S1 and S2 are closed, S3 is open, and the generator output is set to an optimum so that the generator 26 will supply the electrical loads 16 and also charge B1 and B2. As the SOC of the first battery 61 and the SOC of the second battery B2 rise, the method 100 continues to determine the desired operating mode and operating scenario.

The architecture of the electrical energy management system 8 allows operation so as to take advantage of opportunities for improved vehicle efficiency that may be present. For example, when the vehicle having the powertrain 10 is cruising at close to steady speed, there may be an opportunity to operate the engine 2 at a more efficient operating point by increasing the electrical load supplied by the generator 26. The additional power that the generator 26 can produce can be determined by an optimizer algorithm executed in the controller 50, and depends on factors that may include the engine speed and load, vehicle speed, gear state, and torque converter clutch state. The additional current produced by the generator in this opportunity charging mode can be used for charging 61 and/or B2, depending on the SOC of the 61 and B2. With continued reference to FIG. 3, rows 310, 315, 320, 325, and 330 summarize the criteria and corresponding responses used by the method 100 for opportunity charging scenarios.

A first opportunity charging scenario, represented by row 310, is entered when the SOC of the first battery 61 is below a predetermined threshold, for example 80%, and the SOC of the second battery B2 is below a predetermined threshold, for example 30%. In the first opportunity charging scenario S1 and S2 are closed, S3 is open, and the generator output is set to a level to supply an appropriate voltage to the electrical loads 16 while charging B1 and B2.

A second opportunity charging scenario, represented by row 315, is entered when the SOC of the first battery B1 is above a predetermined threshold, for example 80%, and the SOC of the second battery B2 is below a predetermined threshold, for example 40%. In the second opportunity charging scenario S1 and S3 are open. S2 is closed, and the generator charges B2 while B1 supplies the electrical loads 16.

A third opportunity charging scenario, represented by row 320, is entered when the SOC of the first battery B1 is below a predetermined threshold, for example 80%, and the SOC of the second battery B2 is above a predetermined threshold, for example 80%. In the third opportunity charging scenario S1, S2, and S3 are open, and the generator charges B1 and supplies the electrical loads 16.

A fourth opportunity charging scenario, represented by row 325, is entered when the SOC of the first battery B1 is above a predetermined threshold, for example 90%, and the SOC of the second battery B2 is above a predetermined threshold, for example 80%. In the fourth opportunity charging scenario S1 is closed, S2 and S3 are open, and the generator set point voltage is adjusted so that the generator supplies current to the electrical loads 16 while providing only a small current to the first battery B1.

A fifth opportunity charging scenario, represented by row 330, is entered when the SOC of the first battery 11 is below a predetermined threshold, for example 80%, the SOC of the second battery B2 is below a predetermined threshold, for example 30%, and available regeneration power from the generator is above a predetermined threshold, for example 4 kW. In the second opportunity charging scenario S1 and S2 are open, and S3 is closed, thereby connecting the first battery B1 and the second battery B2 in series. The generator voltage set point is adjusted so that the voltage across the electrical loads 16 is within acceptable limits, and the generator charges the first battery B1 and the second battery B2 as well as supplying current to the electrical loads 16. The fifth opportunity charging scenario is continued until the SOC of the first battery B1 is above a predetermined threshold, for example 90%, or until the SOC of the second battery B2 is above a predetermined threshold, for example 80%, or until available regeneration power from the generator is below a predetermined threshold, for example 3 kW.

While the opportunity charging scenarios described in rows 310, 315, 320, 325, and 330 may be used when the vehicle is cruising at close to steady speed, similar control modes are feasible under coasting conditions except that the level of regeneration will be limited based on drivability criteria and other variables such as vehicle speed, engine speed, gear state, torque converter clutch state, etc. Likewise, similar control modes are feasible under braking conditions except that the level of regeneration will be limited based on the level of braking and other variables such as vehicle speed, engine speed, gear state, torque converter clutch state, etc. With continued reference to FIG. 3, rows 335, 340, 345, 340, and 345 summarize the criteria and corresponding responses used by the method 100 for coasting/braking scenarios. The description of these coasting/braking scenarios is similar to the opportunity charging scenarios described in rows 310, 315, 320, 325, and 330, although the example predetermined threshold values in the discussion of opportunity charging scenarios may not be applicable to coasting/braking scenarios.

With continued reference to FIG. 3, rows 360, 365, and 370 summarize the criteria and corresponding responses used by the method 100 for scenarios when the vehicle is in an auto stop mode. During auto stop the engine is not running and the vehicle is not moving, and accordingly the generator 26 is not operating. A first auto stop scenario represented by row 360 is entered when the SOC of the first battery B1 is above a predetermined threshold, for example 85%. In the first auto stop scenario, S1, S2, and S3 are all open and only B1 supplies current to the electrical loads 16. A second auto stop scenario represented by row 365 is entered when the SOC of the first battery 1 is below a predetermined threshold, for example 80%, and the SOC of the second battery B2 is above a predetermined threshold, for example 50%. In the second auto stop scenario, S1 and S2 are closed, S3 is open, and B2 supplies current to the electrical loads 16. A third auto stop scenario represented by row 370 is entered when the SOC of the first battery B1 is below a predetermined threshold, for example 80%, and the SOC of the second battery B2 is below a predetermined threshold, for example 40%. The method 100 responds to the third auto stop scenario conditions being present by exiting the auto stop mode so that the engine can drive the generator to charge the first battery B1 and the second battery B2 and to supply current to the electrical loads 16.

Row 375 in FIG. 3 represents an auto start operating mode. In this operating mode, the state of charge of the first battery 12 and the second battery 14 are not considered. In this operating mode, switch S1 is open, switch S2 is open, and switch S3 is closed. Generator voltage level is irrelevant since the generator is not producing power. In this operating mode, the first battery 12 is connected in series with the second battery 14, resulting in a nominal voltage of 24 volts supplied to the starter motor 22.

It will be appreciated that the three switches S1, S2. S3, each having two possible states (open or closed) represent eight possible switch state combinations. Referring to FIG. 1, it can be seen that if S3 is closed both S1 and S2 must be open; otherwise, a short circuit will appear across the first battery 12, the second battery 14, or both the first battery 12 and the second battery 14. Accordingly, three of the eight possible switch combinations (S1 closed, S2 open, S3 closed; S1 open. S2 closed, S3 closed, and S1 closed, S2 closed, S3 closed) are to be avoided, so that in practice only five of the possible eight switch state combinations are useful. These five combinations appear in columns 225, 230, and 235 of FIG. 3.

With reference to FIG. 3 and FIG. 1, a first useful switch state combination is S1 open, S2 open, and S3 open. With the switches in this configuration, the generator 26 does not supply current to the first battery 12, the second battery 14, or the loads 16. The second battery 14 does not supply current to or receive current from any other portion of the circuit. The first battery 12 supplies current to the loads 16.

With continued reference to FIG. 3 and FIG. 1, a second useful switch state combination is S1 open, S2 open, and S3 closed. With the switches in this configuration, the generator 26 is connected across the series combination of the first battery 12 and the second battery 14. The starter motor 22 is connectable to the series combination of the first battery 12 and the second battery 14 by means of the starter switch 24. Depending on the output voltage setting of the generator 26 either the generator 26 or the first battery 12 supplies current to the loads 16.

With continued reference to FIG. 3 and FIG. 1, a third useful switch state combination is S1 closed, S2 closed, and S3 open. With the switches in this configuration, the generator 26 is connected across the parallel combination of the first battery 12 and the second battery 14. The starter motor 22 is connectable to the parallel combination of the first battery 12 and the second battery 14 by means of the starter switch 24. Depending on the output voltage setting of the generator 26 either the generator 26, the first battery 12, or the second battery 14 supplies current to the loads 16.

With continued reference to FIG. 3 and FIG. 1, a fourth useful switch state combination is S1 open, S2 closed, and S3 open. With the switches in this configuration, the generator 26 is connected across the second battery 14. The starter motor 22 is connectable to the second battery 14 by means of the starter switch 24. The first battery 12 supplies current to the loads 16.

With continued reference to FIG. 3 and FIG. 1, a fifth useful switch state combination is S1 closed, S2 open, and S3 open. With the switches in this configuration, the generator 26 is connected across the first battery 12. The second battery 14 does not supply current to or receive current from any other portion of the circuit. The starter motor 22 is connectable to the first battery 12 by means of the starter switch 24. The generator 26 supplies current to the loads 16, and, depending on the output voltage setting of the generator 26, may also provide charging current to the first battery 12.

The energy management system 8 and method 100 disclosed herein allow several advantages to be realized. The ability to connect the first battery 12 and the second battery 14 in series allows for enhanced energy recuperation for a given generator current due to doubling of the voltage. For example, a generator producing 250 A can produce 6 kW of regeneration power when operating at 24V. This can result in a significant improvement in fuel economy compared to a 12V system. Additionally, cold cranking and auto start operation can be improved by operating the starter motor at 24V. Inclusion of the second battery 14 in the energy management system 8, and managing aspects of the charging of the first battery 12 and the second battery 14 as described in the discussion of the exemplary method 100 allows for improved management of mechanical loading of the engine caused by generator current demand, which can result in improved fuel economy and improved vehicle performance under certain driving conditions. Additionally, the inclusion of the DC-DC converter 18 enables a stable 12V DC bus to be maintained during engine starting, which can eliminate unacceptable lamp flicker and diagnostic trouble code settings during an engine auto-start event.

Alternative partitioning of functions different from the exemplary architecture depicted in FIG. 1 are also within the scope of the present disclosure. For example, it is envisioned that the control signals 17 may be communicated to the electrical energy management system 8 via CAN bus 35 or other communication channel, or via discrete signals between the controller 50 and the electrical energy management system 8. Alternatively, the switches S1, S2, S3 may be integrated into the controller 50, or into a battery fuse distribution unit (not shown). Such benefits and other possible benefits will be apparent to one of ordinary skill in the art in view of the present disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electrical energy management system for a powertrain, the powertrain comprising an internal combustion engine configured to deliver mechanical energy to a mechanical load, the electrical energy management system comprising:
    a first battery having a nominal operating voltage;
    a second battery having a charging voltage sufficiently close to the nominal operating voltage of the first battery such that the first battery can charge the second battery when the first battery and the second battery are electrically connected in parallel;
    a generator that is controllable to provide a variable output voltage;
    a starter motor;
    an electrical load;
    a plurality of switches in electrical communication with at least one of the first battery and the second battery, each of the plurality of switches controllable to be in an open state or a closed state;
    a controller that is configured to control the output voltage of the generator and to control the open or closed state of each of the plurality of switches, the controller including non-transitory computer-readable media containing instructions that when executed cause the controller to execute a method comprising the steps of:
    receiving information regarding operating conditions of the powertrain;
    determining a desired operating mode based on the operating conditions;
    determining a desired operating scenario based on the operating conditions; and
    providing control signals to configure the generator and each of the plurality of switches, wherein the configuration of the generator and the configuration of the switches is based on the desired operating scenario.

2. The electrical energy management system of claim 1, wherein the nominal operating voltage is 12 volts.

3. The electrical energy management system of claim 2, wherein the generator is controllable to provide the variable output voltage around two distinct nominal generator voltages, wherein the two distinct nominal generator voltages are 12V and 24V.

4. The electrical energy management system of claim 1, wherein when a state of charge of the first battery is above a predetermined threshold value the determination of the desired operating scenario does not depend on a state of charge of the second battery.

5. The electrical energy management system of claim 1, wherein the desired operating scenario is determined based on a state of charge of the second battery when a state of charge of the first battery is below a predetermined threshold value.

6. The electrical energy management system of claim 1 wherein in a first configuration of the switches the first battery is connected electrically in parallel with the second battery and in a second configuration of the switches the first battery is connected electrically in series with the second battery.

7. The electrical energy management system of claim 6 wherein in a third configuration of the switches the generator is electrically connected so as to be able to supply current to the first battery without being able to supply current to the second battery.

8. The electrical energy management system of claim 7 wherein in a fourth configuration of the switches the generator is electrically connected so as to be able to supply current to the second battery without being able to supply current to the first battery.

9. The electrical energy management system of claim 1 wherein the desired operating mode is selected from the group consisting of cold crank, idle, acceleration, cruise, opportunity charging, coasting/braking, auto stop, and auto start.

10. The electrical energy management system of claim 1 further comprising a DC-DC converter configured to provide a stabilized voltage bus to source current to a voltage-sensitive load.

11. A method for controlling an electrical energy management system for a powertrain, the powertrain comprising an internal combustion engine configured to deliver mechanical energy to a mechanical load, the electrical energy management system comprising:
- a first battery having a nominal operating voltage;
- a second battery having a charging voltage sufficiently close to the nominal operating voltage of the first battery such that the first battery can charge the second battery when the first battery and the second battery are electrically connected in parallel;
- a generator that is controllable to provide a variable output voltage;
- a starter motor;
- an electrical load;
- a plurality of switches in electrical communication with at least one of the first battery and the second battery, each of the plurality of switches controllable to be in an open state or a closed state;

the method comprising the steps of:
- receiving information regarding operating conditions of the powertrain;
- determining a desired operating mode based on the operating conditions;
- determining a desired operating scenario based on the operating conditions; and
- providing control signals to configure the generator and each of the plurality of switches, wherein the configuration of the generator and the configuration of the switches is based on the desired operating scenario.

12. The method of claim 11 wherein the nominal operating voltage is 12 volts.

13. The method of claim 12, wherein the generator is controllable to provide the variable output voltage around two distinct nominal generator voltages, wherein the two distinct nominal generator voltages are 12V and 24V.

14. The method of claim 11 wherein when a state of charge of the first battery is above a predetermined threshold value the determination of the desired operating scenario does not depend on a state of charge of the second battery.

15. The method of claim 11 wherein the desired operating scenario is determined based on a state of charge of the second battery when a state of charge of the first battery is below a predetermined threshold value.

16. The method of claim 11 wherein in a first configuration of the switches the first battery is connected electrically in parallel with the second battery and in a second configuration of the switches the first battery is connected electrically in series with the second battery.

17. The method of claim 16 wherein in a third configuration of the switches the generator is electrically connected so as to be able to supply current to the first battery without being able to supply current to the second battery.

18. The method of claim 16 wherein in a fourth configuration of the switches the generator is electrically connected so as to be able to supply current to the second battery without being able to supply current to the first battery.

19. The method of claim 11 wherein the desired operating mode is selected from the group consisting of cold crank, idle, acceleration, cruise, opportunity charging, coasting/braking, auto stop, and auto start.

20. The method of claim 11 wherein the electrical energy management system further comprises a DC-DC converter configured to provide a stabilized voltage bus to source current to a voltage-sensitive load.

* * * * *